(12) United States Patent (10) Patent No.: US 12,563,306 B2

Li et al. (45) Date of Patent: Feb. 24, 2026

(54) PROCESSING METHOD, PROCESSING DEVICE, AND ELECTRONIC DEVICE

(71) Applicant: Lenovo (Beijing) Limited, Beijing (CN)

(72) Inventors: Chunhui Li, Beijing (CN); Zhuoran Xu, Beijing (CN); Zhichao Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 43 days.

(21) Appl. No.: 18/821,844

(22) Filed: Aug. 30, 2024

(65) Prior Publication Data

US 2025/0080836 A1 Mar. 6, 2025

(30) Foreign Application Priority Data

Aug. 31, 2023 (CN) .......................... 202311110688.4

(51) Int. Cl.
| | |
|---|---|
| *H04N 23/741* | (2023.01) |
| *H04N 23/63* | (2023.01) |
| *H04N 23/667* | (2023.01) |
| *H04N 23/743* | (2023.01) |

(52) U.S. Cl.
CPC ........... *H04N 23/741* (2023.01); *H04N 23/63* (2023.01); *H04N 23/667* (2023.01); *H04N 23/743* (2023.01)

(58) Field of Classification Search
CPC .... H04N 23/63; H04N 23/632; H04N 23/667; H04N 23/73; H04N 23/741; H04N 23/743; H04N 23/745
See application file for complete search history.

(56) References Cited

U.S. PATENT DOCUMENTS

2018/0227479 A1*  8/2018  Parameswaran ....... H04N 23/63
2023/0269486 A1*  8/2023  Xiao ....................... H04N 23/73
                                                    348/222.1

FOREIGN PATENT DOCUMENTS

CN          110445988  A  * 11/2019  ........... H04N 23/741

OTHER PUBLICATIONS

Machine Translation of CN-110445988-A published Nov. 12, 2019 which is included which the provided foreign document.*

* cited by examiner

*Primary Examiner* — Daniel M Pasiewicz
(74) *Attorney, Agent, or Firm* — ANOVA LAW GROUP, PLLC

(57) ABSTRACT

A processing method including performing photographing in response to a photographing instruction, at least indicating a target algorithm, based on an environmental parameter, to capture first, second, and third images. The first, second, and third images are captured by an image acquisition device based on first, second, and third photographing values of a target parameter, respectively. The first photographing value is related to the environmental parameter. The first, second, and third photographing values differ from each other. The method further includes displaying based on the first image to present a first display effect, and obtaining a target image based on the target algorithm and an image group including the first, second, and third images. The first display effect is consistent with a second display effect presented through displaying based on an image captured based on a fourth photographing value of the target parameter after the target image is obtained.

20 Claims, 5 Drawing Sheets

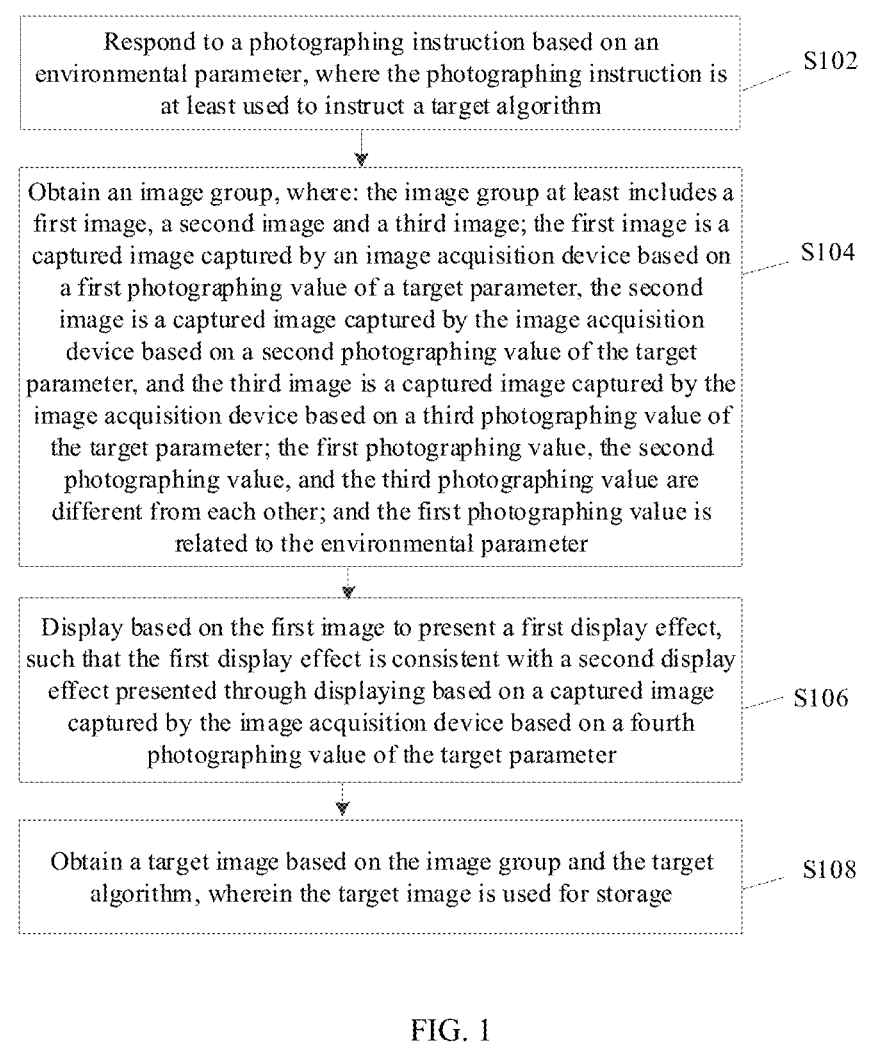

Respond to a photographing instruction based on an environmental parameter, where the photographing instruction is at least used to instruct a target algorithm — S102

Obtain an image group, where: the image group at least includes a first image, a second image and a third image; the first image is a captured image captured by an image acquisition device based on a first photographing value of a target parameter, the second image is a captured image captured by the image acquisition device based on a second photographing value of the target parameter, and the third image is a captured image captured by the image acquisition device based on a third photographing value of the target parameter; the first photographing value, the second photographing value, and the third photographing value are different from each other; and the first photographing value is related to the environmental parameter — S104

Display based on the first image to present a first display effect, such that the first display effect is consistent with a second display effect presented through displaying based on a captured image captured by the image acquisition device based on a fourth photographing value of the target parameter — S106

Obtain a target image based on the image group and the target algorithm, wherein the target image is used for storage — S108

FIG. 1

PROCESSING METHOD, PROCESSING DEVICE, AND ELECTRONIC DEVICE

CROSS-REFERENCE TO RELATED APPLICATION

This application claims priority to Chinese Patent Application No. 202311110688.4, filed on Aug. 31, 2023, the entire content of which is incorporated herein by reference.

TECHNICAL FIELD

The present disclosure generally relates to the field of image processing technologies and, more particularly, to a processing method, a processing device, and an electronic device.

BACKGROUND

When using a photography mode such as a high dynamic range imaging (HDR) mode or a night scene mode, an electronic device displays based on a captured image captured in real time by an image acquisition device. During the execution of the photography instruction in the HDR mode or night scene mode, the image acquisition device not only captures an image according to the brightness value determined by the current ambient light brightness (i.e., capturing the EV0 image), but also captures an image according to the brightness value higher than the ambient light brightness (i.e., capturing the EV+ image) and an image according to the brightness value lower than the ambient light brightness (i.e., capturing the EV- image). After the HDR mode or night scene mode photography ends, the image acquisition device will only capture the EV0 image. Therefore, at the moment when the HDR mode or night scene mode photography ends, the image displayed by the image acquisition device will have a change in brightness, which will cause flickering after the HDR mode or night scene mode photography.

SUMMARY

In accordance with the present disclosure, there is provided a processing method including performing photographing in response to a photographing instruction based on an environmental parameter, to capture a first image, a second image, and a third image. The photographing instruction at least indicates a target algorithm. The first image is captured by an image acquisition device based on a first photographing value of a target parameter that is related to the environmental parameter, the second image is captured by the image acquisition device based on a second photographing value of the target parameter, and the third image is captured by the image acquisition device based on a third photographing value of the target parameter. The first photographing value, the second photographing value, and the third photographing value are different from each other. The method further includes displaying based on the first image to present a first display effect, and obtaining a target image for storage based on the target algorithm and an image group including the first image, the second image, and the third image. The first display effect is consistent with a second display effect presented through displaying based on an image captured by the image acquisition device based on a fourth photographing value of the target parameter after the target image is obtained.

Also in accordance with the present disclosure, there is provided an electronic device including an image acquisition device, a display output device, a processor, and a memory storing one or more program codes that, when executed by the processor, cause the electronic device to perform photographing in response to a photographing instruction based on an environmental parameter, to capture a first image, a second image, and a third image. The photographing instruction at least indicates a target algorithm. The first image is captured by an image acquisition device based on a first photographing value of a target parameter that is related to the environmental parameter, the second image is captured by the image acquisition device based on a second photographing value of the target parameter, and the third image is captured by the image acquisition device based on a third photographing value of the target parameter. The first photographing value, the second photographing value, and the third photographing value are different from each other. The one or more program codes, when executed by the processor, further cause the electronic device to display, through the display output device, based on the first image to present a first display effect, and obtain a target image for storage based on the target algorithm and an image group including the first image, the second image, and the third image. The first display effect is consistent with a second display effect presented through displaying based on an image captured by the image acquisition device based on a fourth photographing value of the target parameter after the target image is obtained.

Also in accordance with the present disclosure, there is provided a non-transitory computer-readable storage medium storing one or more program codes that, when executed by a processor, cause an electronic device containing the processor to perform photographing in response to a photographing instruction based on an environmental parameter, to capture a first image, a second image, and a third image. The photographing instruction at least indicates a target algorithm. The first image is captured by an image acquisition device based on a first photographing value of a target parameter that is related to the environmental parameter, the second image is captured by the image acquisition device based on a second photographing value of the target parameter, and the third image is captured by the image acquisition device based on a third photographing value of the target parameter. The first photographing value, the second photographing value, and the third photographing value are different from each other. The one or more program codes, when executed by the processor, further cause the electronic device to display based on the first image to present a first display effect, and obtain a target image for storage based on the target algorithm and an image group including the first image, the second image, and the third image. The first display effect is consistent with a second display effect presented through displaying based on an image captured by the image acquisition device based on a fourth photographing value of the target parameter after the target image is obtained.

BRIEF DESCRIPTION OF THE DRAWINGS

FIG. 1 is a flowchart of a processing method consistent with the present disclosure.

DETAILED DESCRIPTION OF THE EMBODIMENTS

Figure 2:
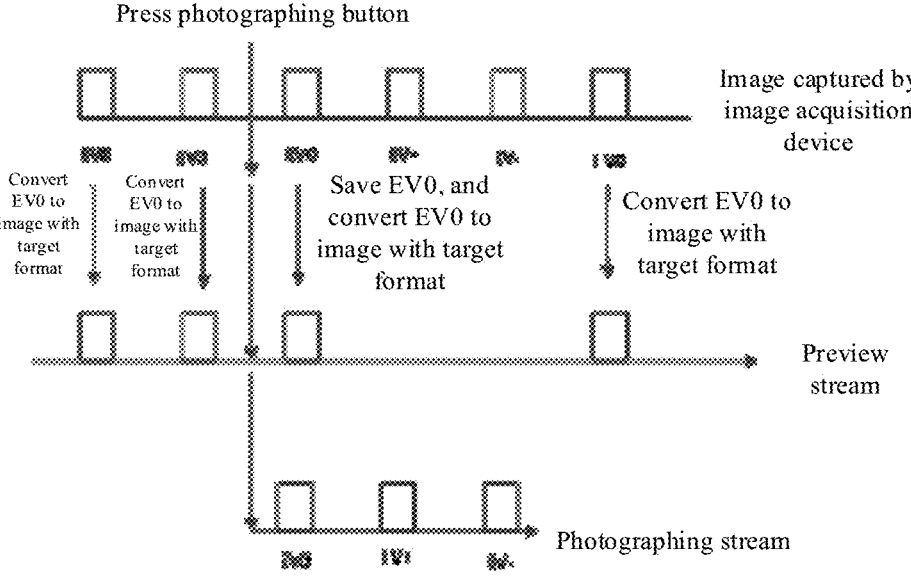
FIG. 2 is a schematic diagram showing images in a preview stream and a photographing stream consistent with the present disclosure.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure. Various modifications may be made to the embodiments of the present disclosure. Thus, the described embodiments should not be regarded as limiting, but are merely examples. Those skilled in the art will envision other modifications within the scope and spirit of the present disclosure.

The present disclosure provides a processing method, and the processing method may be applied to an electronic device such as a cell phone, a camera, a computer, etc. As shown in FIG. 1, the method includes S102 to S108.

At S102, a photographing instruction is responded to based on an environmental parameter, where the photographing instruction is at least used to indicate a target algorithm.

In one embodiment, the environmental parameter may include but is not limited to the current ambient light brightness.

In one embodiment, the target algorithm may include but is not limited to a HDR mode algorithm or a night scene mode algorithm. The content of the target algorithm may include but is not limited to: which optical components are used for taking pictures; how may EV+ images are captured; how may EV− images are captured; how many EV0 images are captured; the capture order of the EV0 images, the EV+ images, and the EV− images; or the synthesis rules of the EV0 images, the EV+ images, and the EV− images.

Generally, the HDR mode algorithm and the night scene mode algorithm may be different in terms of which optical components are used for taking pictures. Also, for the night scene mode algorithm, for some target images that need to be synthesized in the target format, the EV+ image may not be captured. Further, in the HDR mode algorithm, the synthesis rules for the EV0 images, the EV+ images, and the EV− images may be mainly that the effect in which a bright part of the synthesized image is bright and the effect of the dark part is to be able to distinguish outlines and depths of objects, rather than the previous black mass. In the night scene mode algorithm, the synthesis rules for the EV0 images, the EV+ images, and the EV− images may mainly be to analyze each captured image, keep the clearest part, discard the blurred part, and finally merge them into a high-quality image. The synthesis process may optimize the image color, eliminate noise, or enhance details.

In some embodiments, when the user wants to take a photo, the HDR mode and the night scene mode may be manually switched. And, by clicking the photographing button, the corresponding photographing instruction may be generated in the electronic device. The electronic device may obtain the environmental parameter in real time, respond to the photographing instruction based on the current environmental parameters, and take photos according to the target algorithm.

In some embodiments, generally, the default photographing mode of the current image acquisition device may be the HDR mode. The HDR mode may be applied to photographing when the ambient light brightness is higher than a preset brightness, and the night scene mode may be applied to photographing when the ambient light brightness is lower than the preset brightness, such that the electronic device is able to obtain the environmental parameter in real time and automatically switch to the HDR mode or the night scene mode based on the environmental parameter when the user turns on the image acquisition device. For example, when the sensor detects that the brightness of the ambient light of the photographing scene is lower than the preset brightness, the night scene mode may be automatically turned on. When the sensor detects that the ambient light of the photographing scene is sufficient, the HDR mode may be automatically turned on. When the user clicks the photographing button, the photographing instruction may be generated in the electronic device. The electronic device may respond to the photographing instruction based on the current environmental parameter and take photos according to the target algorithm.

At S104, an image group is obtained. The image group may include at least a first image, a second image, and a third image. The first image may be a captured image captured by the image acquisition device based on a first photographing value of a target parameter, the second image may be a captured image captured by the image acquisition device based on a second photographing value of the target parameter, and the third image may be a captured image captured by the image acquisition device based on a third photographing value of the target parameter. The first photographing value, the second photographing value, and the third photographing value may be different from each other; and the first photographing value may be related to the environmental parameter.

In one embodiment, the target parameter may be exposure. The first photographing value of the target parameter may be related to the environmental parameter, that is, the first photographing value of the target parameter may be determined according to the current ambient light brightness. The second photographing value may be larger than the first photographing value or smaller than the first photographing value. The third photographing value may be larger than the first photographing value or smaller than the first photographing value. One of the second photographing value and the third photographing value may be larger than the first photographing value, and the other may be smaller than the first photographing value.

In one embodiment, the electronic device may capture at least one captured image based on the target algorithm and the first photographing value of the target parameter, capture at least one captured image based on the target algorithm and the second photographing value of the target parameter, and capture at least one captured image based on the target algorithm and the third photographing value of the target parameter through the image acquisition device, to form the image group.

At S106, a first display effect is presented through displaying based on the first image, such that the first display effect is consistent with a second display effect presented through displaying according to the captured image captured by the image acquisition device based on a fourth photographing value of the target parameter after the target image is obtained.

In one embodiment, as shown in FIG. 2, when the electronic device's photographing function is turned on but is not photographing, the image acquisition device of the electronic device may capture images in real time based on environmental parameter, and process them into images in a target format for preview, forming a preview stream. During the photographing process, the image acquisition device of the electronic device may take photos based on the target algorithm, thereby not only obtaining the first image corresponding to the environmental parameter (such as the EV0 image) but also obtaining the second image and the third image that do not correspond to the environmental parameter, such as the EV+ image and the EV− image. Therefore, for the preview stream, the captured images captured by the image acquisition device in real time may no longer be directly processed into the images in the target format for preview, otherwise there may be flickering at the end of photographing. Therefore, in one embodiment, during the photographing process, after the first image is captured, the first display effect may be presented based on the first image, such that there may be no flickering during the photographing process. Since the first image is captured according to the environmental parameter, the first image and the captured image captured by the image acquisition device based on the fourth photographing value of the target parameter after the end of the photographing may not be much different in brightness, and there may be no flickering at the end of the photographing.

In one embodiment, when the first image is captured, the first image may be cached.

In one embodiment, when displaying based on the first image, a first preview image may be displayed. The first image may be an ultra-wide-angle image or an ultra-resolution image. When previewing, it may not be necessary to display such a large image range or such a high-resolution image. Therefore, the electronic device may need to convert the image captured by the image acquisition device into a target format corresponding to the preview stream, input it into the preview stream frame by frame, and the display unit may read and display it frame by frame. The first image may be converted into the first preview image of the target format corresponding to the preview stream, and then may be output to the preview stream, and finally the first preview image may be displayed on the display unit.

In some embodiments, when displaying based on the first image, the cached first image may be processed into an image of the target format, and then input into the preview stream. Before acquiring the image captured based on the fourth photographing value of the target parameter, the image in the preview stream may not be updated, such that the display is always performed based on the first image during the photographing process.

In some other embodiments, when displaying based on the first image, the cached first image may be processed into an image of the target format, and then input into the preview stream. Before acquiring the image captured based on the fourth photographing value of the target parameter, according to the frequency of image update in the preview stream, the first image may be continuously processed into an image in a target format and input into the preview stream, such that the display is always based on the first image during the photographing process.

At S108, a target image is obtained based on the image group and the target algorithm, and the target image is used for storage.

In one embodiment, during the photographing process, the image acquisition device may capture the first image, the second image, and the third image, and sequentially input them into the photographing stream. The electronic device may use the image synthesis rule in the target algorithm to synthesize the first image, the second image, and the third image in the photographing stream to obtain the target image, and save the target image.

The processing method provided by the embodiments of the present disclosure may respond to the photographing instruction based on the environmental parameter. The photographing instruction may be at least used to indicate the target algorithm. The image group may be obtained, and the image group may at least include the first image, the second image, and the third image. The target image may be obtained based on the image group and the target algorithm, and the target image may be used for storage. Before obtaining the target image based on the image group and the target algorithm, the method may further include: displaying based on the first image to present the first display effect, such that the first display effect is consistent with the second display effect presented by displaying based on the captured image captured by the image acquisition device according to the fourth photographing value of the target parameter after the target image is obtained. Therefore, in the photographing process based on the target algorithm, the display may be always based on the first image, and the first display effect presented by the display of the first image may be consistent with the second display effect presented by displaying the captured image captured by the image acquisition device based on the fourth photographing value of the target parameter after the target image is obtained, such that the switching of the displayed image does not cause a change in the display effect such as a change in brightness at the moment when photographing based on the target algorithm ends, thereby avoiding flickering after the photographing ends. Also, in the photographing process based on the target algorithm, the display may be always based on the first image, which may reduce the memory consumption of image transmission and reduce system operating resources.

In one embodiment, the first display effect may be presented by displaying based on the first image until a preview image is obtained, and the preview image may be an image determined according to a captured image captured by the image acquisition device based on the fourth photographing value of the target parameter.

In one embodiment, the fourth photographing value may be related to the environmental parameter, but the fourth photographing value may be the same as or different from the first photographing value as the environmental parameter changes.

In one embodiment, the preview image may be obtained, indicating that the image in the preview stream is able to be updated and it is no longer necessary to display based on the first image. This is because at the moment of obtaining the target image, the image acquisition device may capture the captured image based on the fourth photographing value of the target parameter, process it into an image in the target format, obtain the preview image, and input it into the preview stream, such that the newly input preview image in the preview stream may be used for display at the next moment of obtaining the target image. Therefore, the first display effect may be presented through displaying based on the first image until the preview image is obtained. Correspondingly, before the preview image is obtained, the first display effect may be presented through displaying based on the first image. In this way, even when the camera captures the second image and the third image during the photographing process, the display may not be performed based on the second image and the third image, such that flickering during the photographing process and at the moment when the photographing ends may be avoided.

In one embodiment, the first display effect may be presented through displaying for a target duration based on the first image, and the target duration may be the duration of the image acquisition device capturing the captured image based on the second photographing value of the target parameter, the duration of the image acquisition device capturing the captured image based on the third photographing value of the target parameter, or the duration of the target image obtained based on the image group and the target algorithm.

In one embodiment, in theory, the preview stream may obtain an image at the first moment, an image at the second moment, and an image at the third moment. When taking a photo, the first image obtained may be converted into a first preview image and input into the preview stream. In theory, a new image may be input into the preview stream at the next moment after the first image is obtained. In the present embodiment, after the first preview image is generated, a new preview image may not be generated, such that objectively the display duration of the first preview image is lengthened, which is longer than the display duration of other preview images in the preview stream when no photo is taken. The total display duration of the first preview image may be the target duration. That is, the first display effect may be presented through displaying for the target duration based on the first image. Objectively, it may not be necessary to set the duration of the first preview image in the electronic device, but the objective mechanism may lead the first display effect presented through displaying for the target duration based on the first image.

In one embodiment, the first display effect may be presented through displaying for the target duration based on the first image, such that the first display effect is always presented through displaying based on the first image before the target image is obtained. In this way, even when the image acquisition device captures the second image and the third image during the photographing process, the display may not be performed based on the second image and the third image, which may avoid flickering during the photographing process and at the moment when the photographing ends.

In one embodiment, the first display effect may be presented through displaying based on the first image until the target image is obtained.

In this embodiment, obtaining the target image may indicate that the photographing is completed, and it may be no longer necessary to display based on the first image. This is because, at the moment of obtaining the target image, the image acquisition device may capture the captured image based on the fourth photographing value of the target parameter, and process it into an image of the target format, and input it into the preview stream, such that the preview image newly input in the preview stream is used for display at the next moment of obtaining the target image. Therefore, the first display effect may be presented through displaying based on the first image until the target image is obtained, such that the first display effect is presented through displaying based on the first image before the target image is obtained. In this way, even when the camera captures the second image and the third image during the photographing process, the display may not be performed based on the second image and the third image, which may avoid flickering during the photographing process and at the moment when the photographing ends.

In some embodiments, the first display effect may be presented through displaying based on the first image until the target image is obtained. Specifically, the first display effect may be presented through displaying for the target duration based on the first image display. The target duration may be the duration for the image acquisition device to capture the captured image based on the second photographing value of the target parameter, the duration for the image acquisition device to capture the captured image based on the third photographing value of the target parameter, and the duration for obtaining the target image based on the image group and the target algorithm.

In other embodiments, obtaining the preview image may also be used to represent the end of photographing, and the preview image may be an image determined based on the captured image captured by the image acquisition device based on the fourth photographing value of the target parameter. Therefore, the first display effect may be presented through displaying based on the first image until the target image is obtained. Specifically, the first display effect may be presented through displaying based on the first image until the preview image is obtained. The preview image may be an image determined by the captured image captured by the image acquisition device based on the fourth photographing value of the target parameter.

In one embodiment, obtaining the image group may include that:

based on a first photo request, the image acquisition device captures the first captured image based on the first photographing value of the target parameter, and obtains a first preview image based on a first preview request and the first captured image;

based on a second photo request, the image acquisition device captures the second captured image based on the second photographing value of the target parameter; and based on a third photo request, the image acquisition device captures the third captured image based on the third photographing value of the target parameter.

The first photo request, the first preview request, the second photo request, and the third photo request may belong to photographing instruction.

In one embodiment, the second photographing value may be less than the first photographing value, and the third photographing value may be larger than the first photographing value. The first image may include at least one frame of captured image, the second image may include at least one frame of captured image, and the third image may include at least one frame of captured image.

Figure 3:
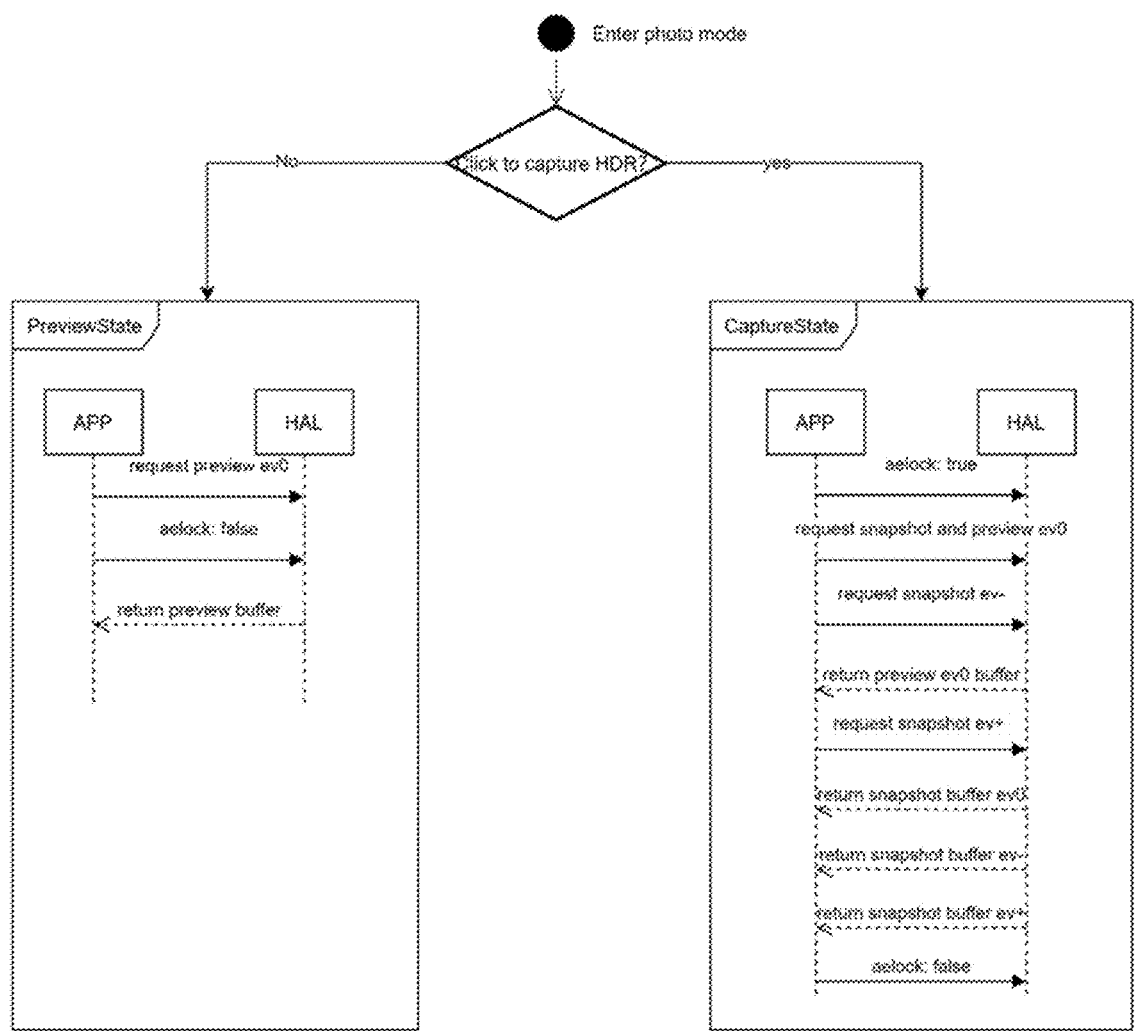
FIG. 3 is a flowchart of another processing method consistent with the present disclosure.
Figure 4:
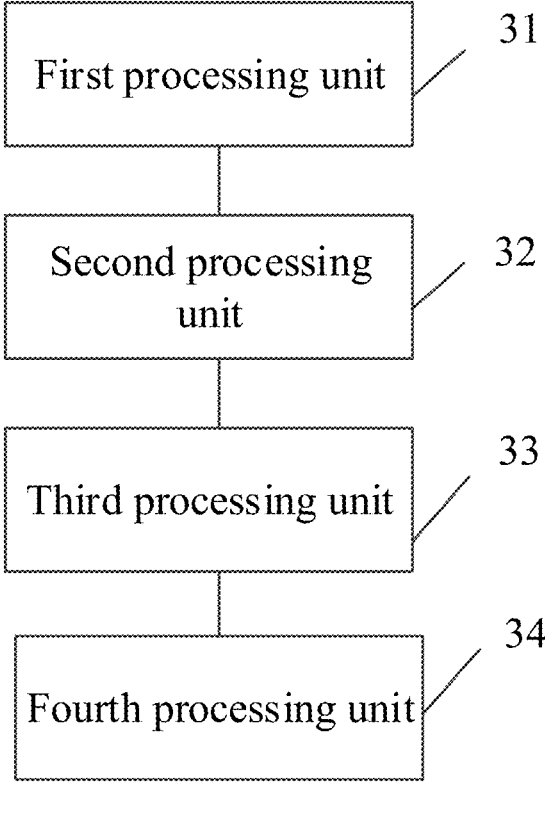
FIG. 4 is a schematic structural diagram of a processing device consistent with the present disclosure.

In one embodiment, for example, the target algorithm may be the HDR mode algorithm. As shown in FIG. 3, when the photographing function is turned on and the HDR mode is not clicked to take a photo, no photo may be taken at this time and it may be in the preview stage. An upper application (APP) of the electronic device may send a request for obtaining the EV0 image for preview to the lower hardware (HAL), and set the automatic exposure (AE) not to be locked, so as not to lock any photographing parameters in the image acquisition device. The lower hardware (HAL), such as the image acquisition device, may capture the captured image based on the environmental parameter based on the request, that is, the EV0 image, process it into an image in the target format, and return it to the APP through the preview stream, that is, return the preview buffer to the APP.

When the photographing function is turned on and the HDR mode is clicked to take a photo, the photographing stage may be entered. First, the AE may be set to be locked to lock other photographing parameters in the image acquisition device except the target parameter. Then the APP may send a request for obtaining the EV0 image for preview and photographing to the HAL, where at least one EV0 image may be requested. HAL, for example, the image acquisition device, based on the request, based on the first photographing value of the exposure, that is, according to the brightness value corresponding to the ambient light brightness, may capture the first image, that is, the EV0 image, process it into an image with the target format in the preview stream, and return it to the APP through the preview stream. And the EV0 image may be returned to the APP through the photographing stream. Then the APP may send a request for obtaining the EV− image for photographing to the HAL. HAL, for example, the image acquisition device, based on the request, based on the second photographing value of the exposure, that is, according to a brightness value lower than the ambient light brightness, may capture the second image, that is, the EV− image, and then return the EV− image to the APP through the photographing stream. Then the APP may send a request for obtaining an EV+ image for photographing to the HAL. Based on the request, HAL, for example, the image acquisition device, may capture the third image, namely, the EV+ image, based on the third photographing value of the exposure, that is, a brightness value higher than the brightness of the ambient light, and then return the EV+ image to the APP through the photographing stream. Then, the AE may be unlocked.

In one embodiment, during the photographing process, the EV0 image request for photographing and preview may be first issued, and the preview request may be only issued once, such that when the EV+ and EV− images are obtained, and when the target image is synthesized by EV0, EV+, and EV−, the preview image is no longer requested. During the photographing process, the EV0 image display may be used to present the first display effect, such that no flickering occurs at the moment the photographing ends, and only one preview image is requested during the photographing process, reducing system operating resources and memory consumption of buffer transfer.

In one embodiment, the processing method may further include: locking automatic exposure in response to the photographing instruction, where locking automatic exposure is used to lock other photographing parameters in the image acquisition device except the target parameter.

After obtaining the target image, the processing method may further include: releasing automatic exposure.

In one embodiment, when the automatic exposure is locked, the values of other photographing parameters may not be changed except the value of the exposure. In this way, AE may not be locked before and after photographing, and aelock may be set to false, such that AE is not locked. AE may be locked after clicking to photograph, and aelock may be set to true so as AE is locked. In this way, the impact on the quality of the synthesized target image may be reduced while maintaining the AE stability before and after photographing.

Figure 5:
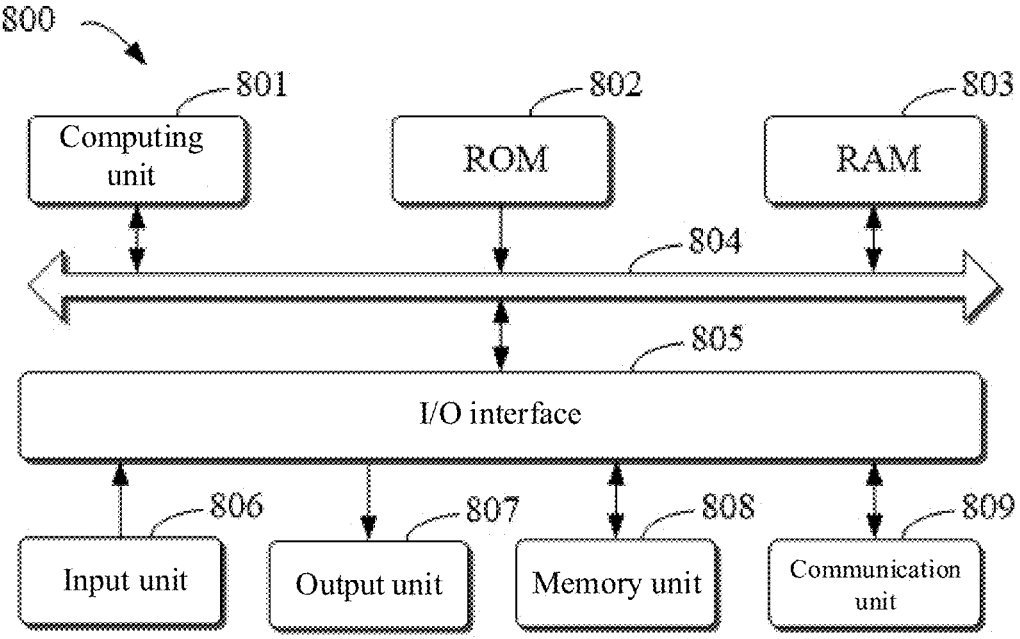
FIG. 5 is a schematic structural diagram of an electronic device consistent with the present disclosure.

The present disclosure also provides a processing device. As shown in FIG. 5, the processing device includes:

a first processing unit 31, used to respond to a photographing instruction based on an environmental parameter, where the photographing instruction is at least used to indicate a target algorithm;

a second processing unit 32, used to obtain an image group, where: the image group at least includes a first image, a second image, and a third image; the first image is a captured image captured by an image acquisition device based on a first photographing value of the target parameter, the second image is a captured image captured by the image acquisition device based on a second photographing value of the target parameter, and the third image is a captured image captured by the image acquisition device based on a third photographing value of the target parameter; and the first photographing value, the second photographing value, and the third photographing value are different; the first photographing value is related to the environmental parameter;

a third processing unit 33, used to obtain a target image based on the image group and the target algorithm, where the target image is used for storage; and a fourth processing unit 34, used to display based on the first image to present a first display effect before obtaining the target image based on the image group and the target algorithm, such that the first display effect is consistent with a second display effect presented through displaying based on the captured image captured by the image acquisition device according to the fourth photographing value of the target parameter after the target image is obtained.

The processing device provided in the embodiments of the present disclosure may respond to the photographing instruction based on the environmental parameter, where the photographing instruction is at least used to indicate the target algorithm. The image group may be obtained. The image group may at least include the first image, the second image, and the third image. The target image may be obtained based on the image group and the target algorithm, and the target image may be used to save. Before obtaining the target image based on the image group and the target algorithm, display may be performed based on the first image to present the first display effect, such that the first display effect is consistent with the second display effect presented through displaying based on the captured image captured by the image acquisition device based on the fourth photographing value of the target parameter after the target image is obtained. In this way, in the process of photographing based on the target algorithm, the display may be always performed based on the first image, and the first display effect presented through displaying based on the first image may be consistent with the second display effect presented through displaying based on the captured image captured by the image acquisition device based on the fourth photographing value of the target parameter after the target image is obtained, such that the switching of the displayed images does not cause a change in the display effect, such as a change in brightness, at the moment when photographing based on the target algorithm ends, thereby avoiding flickering after the photographing ends. Also, in the process of photographing based on the target algorithm, the display may be always performed based on the first image, which may reduce the memory consumption of image transmission and reduce system operating resources.

In some embodiments, the fourth processing unit may be also used to display the first image to present the first display effect until the target image is obtained.

The first display effect may be presented through displaying based on the first image until the preview image is obtained, and the preview image may be an image determined based on the captured image captured by the image acquisition device based on the fourth photographing value of the target parameter.

In some embodiments, the fourth processing unit may be also used to display for a target duration based on the first image to present the first display effect. The target duration may be the duration of the image acquisition device capturing the captured image based on the second photographing value of the target parameter, the duration of the image acquisition device capturing the captured image based on the third photographing value of the target parameter, and the duration of the target image obtained based on the image group and the target algorithm.

In some embodiments, the second processing unit may be used to:

capture the first captured image based on the first photographing value of the target parameter based on the first photographing request of the image acquisition device, and obtain the first preview image based on the first preview request and the first captured image;

based on the second photographing request, capture the second captured image based on the second photographing value of the target parameter of the image acquisition device; and based on the third photographing request, capture the third captured image based on the third photographing value of the target parameter of the image acquisition device.

The first photographing request, the first preview request, the second photographing request, and the third photographing request may belong to the photographing instruction.

In some embodiments, the second photographing value may be less than the first photographing value, and the third photographing value may be larger than the first photographing value.

The first image may include at least one frame of captured image, the second image may include at least one frame of captured image, and the third image may include at least one frame of captured image.

In some embodiments, the processing device may further include:

a locking unit, used to lock the automatic exposure in response to the photographing instruction; and an unlocking unit, configured to release the automatic exposure after obtaining the target image.

The present disclosure also provides an electronic device and a readable storage medium.

The present disclosure also provides an electronic device that is able to implement the method provided by various embodiments of the present disclosure. The electronic device may include various forms of digital computers, such as laptop computers, desktop computers, workstations, personal digital assistants, servers, blade servers, mainframe computers, or other suitable computers. The electronic device may also represent various forms of mobile devices, such as personal digital processing, cellular phones, smart phones, wearable devices, or other similar computing devices. The components shown herein, their connections and relationships, and their functions are merely examples and are not intended to limit the implementation of the present disclosure described and/or required herein.

As shown in FIG. 5, in one embodiment, the electronic device 800 includes a computing unit 801, which is able to perform various appropriate actions and processes according to a computer program stored in a read-only memory (ROM) 802 or a computer program loaded from a storage unit 808 into a random access memory (RAM) 803. In the RAM 803, various programs or data required for the operation of the electronic device 800 may also be stored. The computing unit 801, the ROM 802, and the RAM 803 may be connected to each other through a bus 804. An input/output (I/O) interface 805 may be also connected to the bus 804.

Multiple components in the electronic device 800 are connected to the I/O interface 805, which may include: an input unit 806, such as a keyboard, a mouse, etc.; an output unit 807, such as various types of displays, speakers, etc.; a storage unit 808, such as a disk, an optical disk, etc.; or a communication unit 809, such as a network card, a modem, a wireless communication transceiver, etc. The communication unit 809 may allow the electronic device 800 to exchange information/data with other devices through a computer network such as the Internet and/or various telecommunication networks.

The computing unit 801 may include a variety of general and/or special processing components with processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, digital signal processors (DSPs), or any appropriate processors, controllers, microcontrollers, etc. The computing unit 801 may implement the various methods and processes described above, such as wireless communication methods. For example, in some embodiments, the wireless communication method provided by various embodiments of the present disclosure may be implemented as a computer software program, which is tangibly contained in a machine-readable medium, such as a storage unit 808. In some embodiments, part or all of the computer program may be loaded and/or installed on the electronic device 800 via the ROM 802 and/or the communication unit 809. When the computer program is loaded into the RAM 803 and executed by the computing unit 801, one or more steps of the wireless communication method described above may be performed. Alternatively, in other embodiments, the computing unit 801 may be configured to perform the wireless communication method in any other appropriate manner (e.g., by means of firmware).

Various implementations of the systems and techniques described above herein may be implemented in digital electronic circuit systems, integrated circuit systems, field programmable gate arrays (FPGAs), application specific integrated circuits (ASICs), application specific standard products (ASSPs), systems on chips (SOCs), complex programmable logic devices (CPLDs), computer hardware, firmware, software, and/or combinations thereof. These various implementations may include: being implemented in one or more computer programs that can be executed and/or interpreted on a programmable system including at least one programmable processor, which can be a special purpose or general purpose programmable processor that can receive data and instructions from a storage system, at least one input device, and at least one output device, and transmit data and instructions to the storage system, the at least one input device, and the at least one output device.

The program code for implementing the method of the present disclosure can be written in any combination of one or more programming languages. These program codes can be provided to a processor or a controller of a general-purpose computer, a special-purpose computer or other programmable data processing device, such that the program code, when executed by the processor or controller, enables the function/operation specified in the flow chart and/or the block diagram to be implemented. The program code may be executed completely on the machine, partially on the machine, partially on the machine as an independent software package and partially on a remote machine or completely on a remote machine or server.

In the present disclosure, a machine-readable medium may be a tangible medium, which can contain or store a program used for or in combination with an instruction execution system, a device or an equipment. A machine-readable medium may be a machine-readable signal medium or a machine-readable storage medium. A machine-readable medium may include, but is not limited to, electronic, magnetic, optical, electromagnetic, infrared, or semiconductor systems, devices or equipment, or any suitable combination of the foregoing. More specific examples of machine-readable storage media would include electrical connections based on one or more wires, a portable computer disk, a hard disk, a random access memory (RAM), a read-only memory (ROM), an erasable programmable read-only memory (EPROM or flash memory), optical fibers, a portable compact disk-read-only memory (CD-ROM), an optical storage device, a magnetic storage device, or any suitable combination of the foregoing.

To provide interaction with a user, the systems and techniques described herein may be implemented on a computer having: a display device (such as a cathode ray tube display monitor or a liquid crystal display monitor) for displaying information to the user; or a keyboard and pointing device (e.g., a mouse or trackball) through which the user can provide input to the computer. Other types of devices may also be used to provide interaction with the user; for example, the feedback provided to the user may be any form of sensory feedback (e.g., visual feedback, auditory feedback, or tactile feedback); and input from the user may be received in any form (including acoustic input, voice input, or tactile input).

The systems and techniques described herein may be implemented in a computing system including a backend component (e.g., as a data server), or a computing system including a middleware component (e.g., an application server), or a computing system including a frontend component (e.g., a user computer with a graphical user interface or a web browser through which the user can interact with an implementation of the systems and techniques described herein), or a computing system including any combination of such backend components, middleware components, or frontend components.

The components of the system may be interconnected by digital data communication of any form or medium (e.g., a communication network). Examples of communication networks include: a local area network (LAN), a wide area network (WAN), and the Internet.

A computer system may include a client and a server. The client and server may be generally remote from each other and typically interact through a communication network. The relationship of client and server arises through computer programs running on respective computers and having a client-server relationship to each other. The server may be a cloud server, a server in a distributed system, or a server combined with a blockchain.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, screens, areas, etc., for purposes of understanding and ease of description. It will also be understood that when an element such as a layer, film, region or substrate is referred to as being "on" another element, it may be directly on the other element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

In this disclosure, relational terms such as "first" and "second" are only used to distinguish one entity or operation from another entity or operation, and do not necessarily require or imply that there is such actual relationship or sequence between these entities or operations them. Furthermore, the terms "comprises," "includes," or any other variation thereof are intended to cover a non-exclusive inclusion, such that an article or device including a list of elements includes not only those elements, but also other elements not expressly listed. Or it also includes elements inherent to the article or equipment. Without further limitation, an element associated with the statement "comprises a . . . " does not exclude the presence of other identical elements in an article or device that includes the above-mentioned element.

The disclosed equipment and methods may be implemented in other ways. The device embodiments described above are only illustrative. For example, the division of the units is only a logical function division. In actual implementation, there may be other division methods, such as: a plurality of units or components may be combined, or may be integrated into another system, or some features may be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located in one place or distributed to a plurality of network units.

Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units may be integrated into one unit. The above-mentioned integration units may be implemented in the form of hardware or in the form of hardware plus software functional units.

All or part of the steps to implement the above method embodiments may be completed by hardware related to program instructions. The aforementioned program may be stored in a computer-readable storage medium. When the program is executed, the steps including the above method embodiments may be executed. The aforementioned storage media may include: removable storage devices, ROMs, magnetic disks, optical disks or other media that may store program codes.

When the integrated units mentioned above in the present disclosure are implemented in the form of software function modules and sold or used as independent products, they may also be stored in a computer-readable storage medium. Based on this understanding, the technical solutions of the embodiments of the present disclosure in essence or those that contribute to the existing technology may be embodied in the form of software products. The computer software products may be stored in a storage medium and include a number of instructions for instructing the product to perform all or part of the methods described in various embodiments of the present disclosure. The aforementioned storage media may include: random access memory (RAM), read-only memory (ROM), electrical-programmable ROM, electrically erasable programmable ROM, register, hard disk, mobile storage device, CD-ROM, magnetic disks, optical disks, or other media that may store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A processing method comprising:
performing photographing in response to a photographing instruction based on an environmental parameter, to capture a first image, a second image, and a third image, wherein:
the photographing instruction at least indicates a target algorithm;
the first image is captured by an image acquisition device based on a first photographing value of a target parameter, the first photographing value being related to the environmental parameter;
the second image is captured by the image acquisition device based on a second photographing value of the target parameter;
the third image is captured by the image acquisition device based on a third photographing value of the target parameter; and the first photographing value, the second photographing value, and the third photographing value are different from each other;
displaying based on the first image to present a first display effect; and
obtaining a target image for storage based on the target algorithm and an image group including the first image, the second image, and the third image;
wherein the first display effect is consistent with a second display effect presented through displaying based on an image captured by the image acquisition device based on a fourth photographing value of the target parameter after the target image is obtained.

2. The method according to claim 1, wherein displaying based on the first image to present the first display effect includes:
displaying based on the first image to present the first display effect until the target image is obtained.

3. The method according to claim 1, wherein displaying based on the first image to present the first display effect includes:
displaying based on the first image to present the first display effect until a preview image is obtained, the preview image being determined based on the image captured according to the fourth photographing value.

4. The method according to claim 1, wherein displaying based on the first image to present the first display effect includes:
displaying based on the first image to present the first display effect for a target duration, the target duration being a duration needed for capturing the second image and the third image and for obtaining the target image.

5. The method according to claim 1, wherein:
the photographing instruction includes a first photographing request, a preview request, a second photographing request, and a third photographing request; and
performing photographing to capture the first image, the second image, and the third image includes:
capturing, by the image acquisition device based on the first photographing request, the first image based on the first photographing value of the target parameter, and obtaining a preview image based on the preview request and the first image;
capturing, by the image acquisition device based on the second photographing request, the second image based on the second photographing value of the target parameter; and
capturing, by the image acquisition device based on the third photographing request, the third image based on the third photographing value of the target parameter.

6. The method according to claim 1, wherein the second photographing value is smaller than the first photographing value, and the third photographing value is larger than the first photographing value.

7. The method according to claim 1, wherein each of the first image, the second image, and the third image includes at least one frame of captured image captured by the image acquisition device.

8. The method according to claim 1, further comprising:
in response to the photographing instruction, locking automatic exposure to lock other photographing parameters of the image acquisition device except the target parameter; and
releasing the automatic exposure after the target image is obtained.

9. An electronic device comprising:

an image acquisition device;

a display output device;

a processor; and a memory storing one or more program codes that, when executed by the processor, cause the electronic device to:

perform photographing in response to a photographing instruction based on an environmental parameter, to capture a first image, a second image, and a third image, wherein:

the photographing instruction at least indicates a target algorithm;

the first image is captured by the image acquisition device based on a first photographing value of a target parameter, the first photographing value being related to the environmental parameter;

the second image is captured by the image acquisition device based on a second photographing value of the target parameter;

the third image is captured by the image acquisition device based on a third photographing value of the target parameter; and the first photographing value, the second photographing value, and the third photographing value are different from each other;

display, through the display output device, based on the first image to present a first display effect; and obtain a target image for storage based on the target algorithm and an image group including the first image, the second image, and the third image;

wherein the first display effect is consistent with a second display effect presented through displaying based on an image captured by the image acquisition device based on a fourth photographing value of the target parameter after the target image is obtained.

10. The electronic device according to claim 9, wherein the one or more program codes, when executed by the processor, further cause the electronic device to, when displaying based on the first image to present the first display effect:

display, through the display output device, based on the first image to present the first display effect until the target image is obtained.

11. The electronic device according to claim 9, wherein the one or more program codes, when executed by the processor, further cause the electronic device to, when displaying based on the first image to present the first display effect:

display, through the display output device, based on the first image to present the first display effect until a preview image is obtained, the preview image being determined based on the image captured according to the fourth photographing value.

12. The electronic device according to claim 9, wherein the one or more program codes, when executed by the processor, further cause the electronic device to, when displaying based on the first image to present the first display effect:

display, through the display output device, based on the first image to present the first display effect for a target duration, the target duration being a duration needed for capturing the second image and the third image and for obtaining the target image.

13. The electronic device according to claim 9, wherein:

the photographing instruction includes a first photographing request, a preview request, a second photographing request, and a third photographing request; and the one or more program codes, when executed by the processor, further cause the electronic device to, when performing photographing:

capture, through the image acquisition device based on the first photographing request, the first image based on the first photographing value of the target parameter, and obtaining a preview image based on the preview request and the first image;

capture, through the image acquisition device based on the second photographing request, the second image based on the second photographing value of the target parameter; and capture, through the image acquisition device based on the third photographing request, the third image based on the third photographing value of the target parameter.

14. The electronic device according to claim 9, wherein the second photographing value is smaller than the first photographing value, and the third photographing value is larger than the first photographing value.

15. The electronic device according to claim 9, wherein each of the first image, the second image, and the third image includes at least one frame of captured image captured by the image acquisition device.

16. The electronic device according to claim 9, wherein the one or more program codes, when executed by the processor, further cause the electronic device to:

in response to the photographing instruction, lock automatic exposure to lock other photographing parameters of the image acquisition device except the target parameter; and release the automatic exposure after the target image is obtained.

17. A non-transitory computer-readable storage medium storing one or more program codes that, when executed by a processor, cause an electronic device containing the processor to:

perform photographing in response to a photographing instruction based on an environmental parameter, to capture a first image, a second image, and a third image, wherein:

the photographing instruction at least indicates a target algorithm;

the first image is captured by an image acquisition device based on a first photographing value of a target parameter, the first photographing value being related to the environmental parameter;

the second image is captured by the image acquisition device based on a second photographing value of the target parameter;

the third image is captured by the image acquisition device based on a third photographing value of the target parameter; and the first photographing value, the second photographing value, and the third photographing value are different from each other;

display based on the first image to present a first display effect; and obtain a target image for storage based on the target algorithm and an image group including the first image, the second image, and the third image;

wherein the first display effect is consistent with a second display effect presented through displaying based on an image captured by the image acquisition device based on a fourth photographing value of the target parameter after the target image is obtained.

18. The storage medium according to claim 17, wherein the one or more program codes, when executed by the processor, further cause the electronic device to, when displaying based on the first image to present the first display effect:

display based on the first image to present the first display effect until the target image is obtained.

19. The storage medium according to claim 17, wherein the one or more program codes, when executed by the processor, further cause the electronic device to, when displaying based on the first image to present the first display effect:

display based on the first image to present the first display effect until a preview image is obtained, the preview image being determined based on the image captured according to the fourth photographing value.

20. The storage medium according to claim 17, wherein the one or more program codes, when executed by the processor, further cause the electronic device to:

in response to the photographing instruction, lock automatic exposure to lock other photographing parameters of the image acquisition device except the target parameter; and release the automatic exposure after the target image is obtained.

\* \* \* \* \*